Nov. 29, 1960      K. F. REUMUND      2,961,875
DEVICE FOR SENSING BEARING TEMPERATURE
Filed Sept. 9, 1959
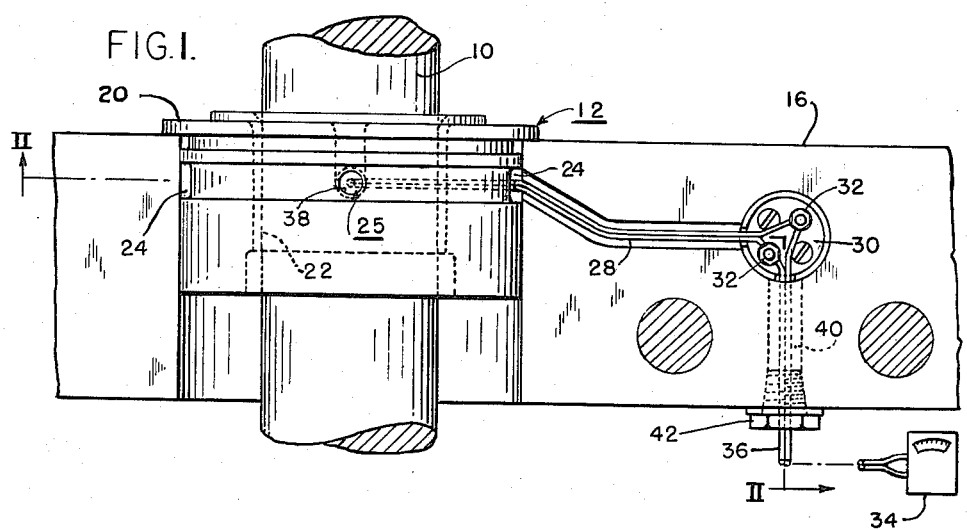
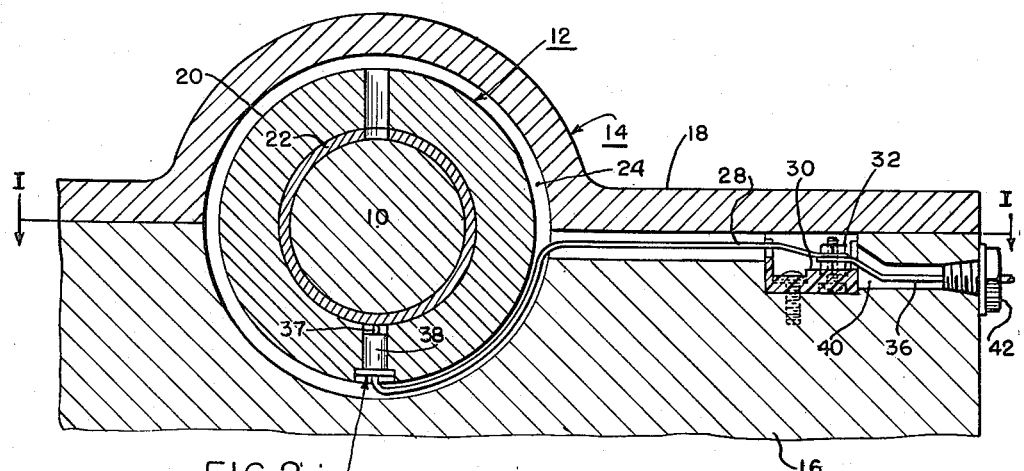
WITNESSES
INVENTOR
KURT F. REUMUND

United States Patent Office 2,961,875
Patented Nov. 29, 1960

2,961,875
DEVICE FOR SENSING BEARING TEMPERATURE

Kurt Felix Reumund, Woodlynne, N.J., assignor to Westinghouse Electric Corporation, East Pittsburgh, Pa., a corporation of Pennsylvania Filed Sept. 9, 1959, Ser. No. 838,951

4 Claims. (Cl. 73—351)

This invention relates to rotary machinery such as turbines, compressors and the like. More particularly the invention relates to the combination of a specially constructed turbine casing and a device for sensing the temperature of a bearing in which the turbine rotor is journalled.

Older arrangements of the type set forth were disadvantages either from the standpoint of inaccessibility to the device or inability to move the cover of the casing without possibly damaging the device, and usually both. In the interest of avoiding the aforesaid disadvantages, the present invention provides for the horizontal surface of the base of the casing to be recessed in a direction transverse to the horizontal axis of the rotor. The recess permits one or more elements of the device and the junction block to which one end of the elements are connected to be accommodated wholly within the base, or below the horizontal surface, where they are safe from damage when the cover is lifted from the base, replaced, or otherwise moved. The recess extends inwardly from a region intermediate the inner and outer edges of the horizontal surface toward the bearing where, in the case of a thermocouple, the elements are joined together in heat transfer relationship with the bearing. And, in order not to interfere with the sealing relationship of the mutually facing horizontal surfaces of the cover and the base, a passageway in the base is provided which extends below the horizontal surface between the recess and the exterior of the casing. A suitable number of leads extend through the passageway from outside the casing and they are connected to the thermocouple elements at the junction block. The leads may be connected as desired to warning devices, recording apparatus, or measuring instruments.

The various objects, features and advantages of the invention will appear more fully from the following description and claims taken in connection with the accompanying drawing, forming a part of this application, in which:

Fig. 1 is a fragmentary view of a turbine embodying the invention taken along line I—I of Fig. 2; and Fig. 2 is a developed sectional view taken along line II—II of Fig. 1.

Referring to the drawing in detail, a horizontal axis turbine rotor 10 is journalled and supported in at least one plane, radial bearing 12, shown carried by a rotor casing 14. The latter includes a lower half or base 16 and an upper half or cover 18, these parts being suitably secured together one below the other, respectively, in sealing engagement in a generally horizontal plane. Preferably, the plane of engagement contains the rotor axis as well as flat, mutually facing surfaces of the base 16 and the cover 18.

The bearing 12 comprises a housing 20 and a bushing 22. As is well known, the bushing 22 contacts the rotor 10 and transmits its load to the bearing housing 20 which, in turn, is supported and held in position by the rotor casing 14. The bearing housing 20 extends into the base 16 and is provided on its outer surface with an annular groove which defines, with the base 16, a conduit 24 for elements of a temperature sensing element, such as a thermocouple 25 or the like.

The thermocouple 25 is employed to measure the temperature of the bearing 12, particularly the bushing 22. Briefly stated, the thermocouple 25 includes a pair of elements 28 or lengths of electrically insulated wire of dissimilar metals, a junction block 30 having electrically insulated binding posts 32 to which the elements 28 are respectively connected, a remote measuring instrument 34, and a pair of leads 36 respectively connecting the ends of the elements 28 at the binding posts 32 to the measuring instrument. It will suffice to say that the instrument 34 comprises a galvanometer installed in an instrument panel of a control room, but may also be a warning device or recording apparatus, or a combination of them.

The thermocouple elements 28 are joined together at one end to form a hot junction 37, inserted in a sleeve 38, passed through a radial passage in the bearing housing 20, and placed with the hot junction in direct heat transfer relationship with the bushing 22. The elements 28 extend from the hot junction at the bushing 22 through part of the annular conduit 24, thence between the base 16 and the cover 18 to the junction block 30 where they are connected to the binding posts.

According to the invention, the upwardly facing surface of the base 16 is recessed in a region intermediate its inner and outer edges to receive the junction block 30 for installation entirely below the horizontal plane of engagement of the base 16 and the cover 18. The same surface has a channel-like continuation of the recess extending transverse to the rotor axis from the junction block 30 to the conduit 24 so that a raceway for the elements 28 is provided entirely below the aforesaid horizontal plane. The recess is at least deep enough to accommodate the junction block 30 and the elements 28 wholly within the base 16 without projecting even partly above the recessed surface of the base.

The base 16 is further provided with a passageway 40 for the leads 36 which extends through the wall of the base, entirely beneath its contact surface, from the junction block recess to the exterior of the casing 14. This provision permits the leads 36 from the instrument 34 to be connected to the elements 28 at the binding posts 32 of the junction block 30 without interfering with the sealing surface of the casing 14. The passageway 40 is closed at the exterior of the base 16 by means of a packing gland 42 through which the leads 36 extend.

With this arrangement, all thermocouple parts within the casing 14 are safe from damage when the cover 18 is moved, as by a crane, during installation and overhaul of the apparatus. Yet, the elements 28 and the leads 36 are accessible for inspection and replacement.

While the invention has been shown in but one form, it will be obvious to those skilled in the art that it is not so limited, but is susceptible of various changes and modifications without departing from the spirit thereof.

What is claimed is:

1. In a rotary machine having a rotor: a casing having upper and lower halves having mutually facing, horizontally extending surfaces engaged in sealing relationship, a bearing for rotatably supporting said rotor, said bearing being carried by said casing and extending at least partly into the lower half of the casing, and a device for sensing the temperature of said bearing; said device including at least one element in heat transfer relationship with said bearing at one end thereof, a junction block to which the other end of said element is connected, and a lead connected to said other end of said element at said junction block and extending to the exterior of said casing; said surface of said lower casing half being provided with a recess extending inwardly toward said bearing from a region intermediate the inner and outer edges of said surface and accommodating said element and said junction block wholly within said lower casing half, said lower casing half having a passageway for said lead extending below the surface thereof between said recess and the exterior of said casing.

2. In a rotary machine having a rotor: a rotor casing including a base and a cover, said base and said cover having mutually facing surfaces engaging in sealing relationship in a generally horizontal plane, at least one bearing for rotatably supporting said rotor, said bearing being carried by said base and supporting said rotor for rotation about an axis parallel to said plane, and a device for sensing the temperature of said bearing; said device including at least one element in heat transfer relationship with said bearing, a junction block having an electrically insulated binding post to which said element is connected, said base having a passageway extending below the surface of said base between the exterior of said base and the junction block, said surface of said base being provided with a recess extending transverse to said axis between said bearing and a region intermediate the inner and outer edges of said surface to accommodate said element and said junction block wholly within said base, and a lead connected to said binding post and extending through said passageway.

3. In rotary apparatus: a horizontal axis rotor, a rotor casing including a base open at the top and a removable cover closing said base, said base and said cover having respective surfaces mutually engaging in sealing relationship in a horizontal plane, a bearing carried at least partly by said base for rotatably supporting said rotor, and a device for sensing the temperature of said bearing; said device including a pair of elements joined together at one end and contacting said one bearing in heat transfer relationship, a junction block having electrically insulated binding posts to which the respective other ends of said elements are connected, said base having a passageway between the exterior of said base and the sealing surface of said base inwardly of the horizontal extent thereof, said surface of said base being recessed between said passageway and said bearing to receive said thermocouple elements and said junction block entirely below said horizontal plane, and a pair of leads extending through said passageway to the exterior of said casing, said leads being connected to respective binding posts.

4. In rotary apparatus: a rotor, a rotor casing including a base and a removable cover having respective surfaces and adapted to be secured together one below the other, respectively, in sealing engagement in a generally horizontal plane containing the rotor axis, a bearing carried at least partly by said base for rotatably supporting said rotor, and a thermocouple for measuring the temperature of said bearing; said thermocouple including a pair of elements joined together at one end and contacting said one bearing in heat transfer relationship, a junction block having electrically insulated binding posts to which the respective other ends of said elements are connected, said base having a passageway between the exterior of said base and the sealing surface of said base inwardly of the horizontal extent thereof, said surface of said base being recessed between said passageway and said bearing to receive said thermocouple elements and said junction block entirely below said horizontal plane, and a pair of leads extending through said passageway, said leads being respectively connected to said binding posts and connectable to a remote measuring instrument.

No references cited.